T. DAVENPORT.
Electric Motor.
No. 132. Patented Feb. 25, 1837.
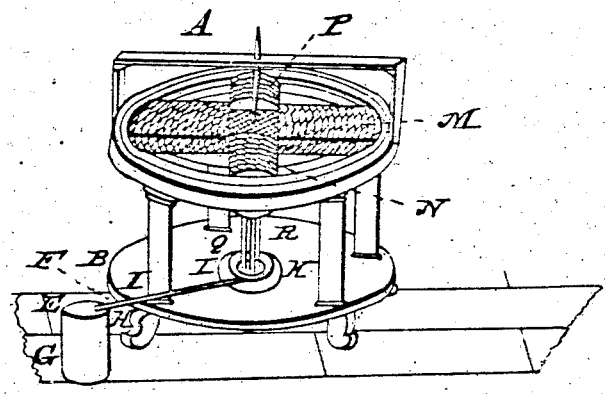
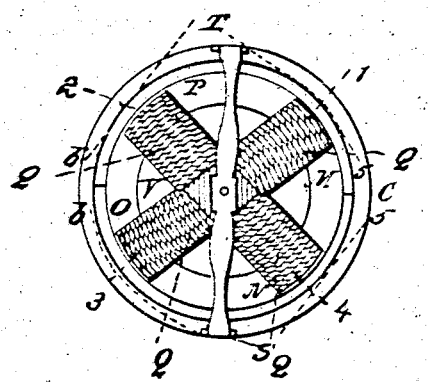
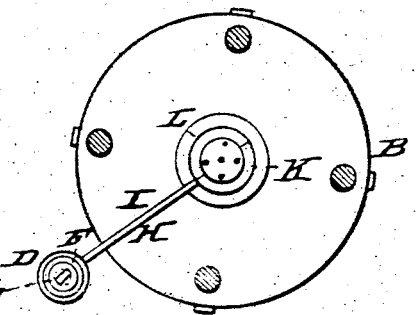
Witnesses:
Inventor:

UNITED STATES PATENT OFFICE.

THOS. DAVENPORT, OF BRANDON, VERMONT.

IMPROVEMENT IN PROPELLING MACHINERY BY MAGNETISM AND ELECTRO-MAGNETISM.

Specification forming part of Letters Patent No. 132, dated February 25, 1837.

*To all whom it may concern:*

Be it known that I, THOMAS DAVENPORT, of the town of Brandon, in the county of Rutland, State of Vermont, have made a discovery, being an Application of Magnetism and Electro-Magnetism to Propelling Machinery, which is described as follows, reference being had to the annexed drawings of the same, making part of this specification.

The machine for applying the power of magnetism and electro-magnetism is described as follows:

The frame A may be made of a circular or any other figure, divided into two or more platforms, B and C, upon which the apparatus rests, of a size and strength adapted for the purpose intended.

The galvanic battery D is constructed by placing plates of copper and zinc E and F, alternately of any figure, in a vessel of diluted acid, G. From each vessel are two conductors, H and I, one from the copper and one from the zinc, leading to and in contact with copper plates K and L placed upon the lower platform. These plates or conductors are made in the form of a segment of a circle corresponding in number with the artificial magnets hereinafter described, placed around the shaft detached from one another and from the shaft, having a conductor leading from the copper plate of the battery to one of said plates on the lower platform, and another conductor leading from the zinc plate of the battery to the next plate on said lower platform, and so on alternately (if there be more than two plates on said lower platform) around the circle.

The galvanic magnets M N O P are constructed of arms or pieces of soft iron in the shape of a straight bar, horseshoe, or any other figure, wound with copper wire Q first insulated with silk between the coils. These arms project on lines from the center of a vertical shaft, R, turning on a pivot or point in the lower platform, said copper wires Q extending from the arms parallel, or nearly so, with the shaft, down to the copper plates K and L and in contact with them. The galvanic magnets are fixed on a horizontal wheel of wood, V, attached to the shaft.

The artificial magnets S T are made of steel and in the usual manner. They may be of any number and degree of strength and fixed on the upper platform, being segments of nearly the same circle as this platform; or, if galvanic magnets are used, (which may be done,) they may be made in the form of a crescent or horseshoe, with their poles pointing to the shaft. Having arranged these artificial magnets on the top of the upper circular platform, there will be a corresponding number of magnetic poles, the north marked 5 and the south pole 6. Now, we will suppose the machine to be in a quiescent state. The galvanic magnet No. 1 being opposite the north pole of the artificial magnets, the galvanic magnet No. 3 will, of course, be opposite the south pole No. 6, and the galvanic magnets Nos. 2 and 4 will be opposite each other, between the poles just mentioned. There being a corresponding number of copper plates or conductors placed below the artificial magnets around the shaft, but detached from it as well as from each other, with wires leading from the galvanic magnets to these plates and in contact with them, as before described, these wires will stand in the same position in relation to the copper plates that the galvanic magnets stand to the artificial magnets, but in contact with the plates.

Now, in order to put the machine in motion, the galvanic magnet No. 2, being changed by the galvanic current passing from the copper plate of the battery along the conductors and wires, becomes a north pole, while at the same time the magnet No. 4 is changed by the galvanic current passing from the zinc plate of the battery, and becomes a south pole. Of course the south pole of the artificial magnet No. 6 will attract the north pole of the galvanic magnet No. 2 and will move it a quarter of a circle. The south pole of the galvanic magnet No. 4, being at the same time attracted by the north pole No. 5, causes the said magnet No. 4 also to perform a quarter of a circle. The momentum of the galvanic arms will carry them past the centers of the poles Nos. 5 and 6, at which time the several wires from the galvanic magnets will have changed their positions in relation to the copper plates or conductors. For instance, the north pole No. 2 having now become a south pole by reason of its wire being brought in contact with the conductors of the zinc plate, and No. 4 having in like manner become a north pole, its wire having changed its position from the zinc plate to the copper plate, the poles of the galvanic magnets are, of course, now repelled by the poles that before attracted them; and in this manner the operation is continued, producing a rotary motion in the shaft, which motion is conveyed to machinery for the purpose of propelling the same.

The discovery here claimed, and desired to be secured by Letters Patent, consists in—

Applying magnetic and electro-magnetic power as a moving principle for machinery in the manner above described, or in any other substantially the same in principle.

THOMAS DAVENPORT.

Witnesses:
W. W. AYRES,
CHAS. A. COOK.